United States Patent Office 3,480,081
Patented Nov. 25, 1969

3,480,081
PRESSURE PULSING OIL PRODUCTION PROCESS
Martin Felsenthal, Howard H. Ferrell, and Robert R. Matthews, Ponca City, Okla., assignors to Continental Oil Company, Ponca City, Okla., a corporation of Delaware
No Drawing. Filed Feb. 20, 1967, Ser. No. 617,086
Int. Cl. E21b 43/20, 43/24, 43/22
U.S. Cl. 166—263                    10 Claims

ABSTRACT OF THE DISCLOSURE

A cyclic oil recovery process wherein there is injected into a subterranean formation containing free gas via an injection well both a gas flooding medium and an aqueous flooding medium to force a substantial part of the free gas into solution in the oil, following which the injection well is made a production well and a substantial part of the free gas comes out of solution. The aqueous flooding medium may be water, brine, or steam.

Background of the invention

This invention relates to a process of oil recovery from subterranean formations. More particularly, the invention relates to a secondary recovery process of oil recovery wherein more oil is withdrawn from normally unproductive sections of highly fractured formations or those of a nonhomogeneous character, e.g., having a widely varying permeability.

Oil is often withdrawn from a reservoir in a nonuniform manner. That is, most of the oil is produced from the more easily drainable sections of the formation, and relatively little oil comes from the less easily drainable sections. This is especially true in highly fractured reservoirs or those having sections of widely varying permeability wherein much valuable oil is left in the less accessible portions of the reservoir. In such reservoirs an ordinary secondary recovery flooding treatment is often of limited value, as the injected fluid tends to sweep or pass through the same sections of the formation which are susceptible to good drainage, thus either bypassing or entering to only a limited extent those sections of the formation which cannot be readily drained.

In order to free more of the oil in these inaccessible parts of the reservoir, there has developed a pressure pulse flooding process wherein a fluid such as either water or hydrocarbon gas is injected, by way of an injection well, into a partially depleted reservoir to raise the pressure to approximately the original reservoir pressure or above. The reservoir is then produced, and the reservoir pressure decreases. When water is the injected flood medium, it is postulated that water is imbibed in to the pores of the tighter, less accessible portions of the reservoir. During the depressuring portion of the cycle when the reservoir is produced, there is a capillary retention of water in these pores and a release of the formerly trapped oil which is free to move from the rock matrix into fractures and/or zones of higher permeability from which it can be more readily produced. In pressure pulse flooding using a hydrocarbon gas as the flooding medium, referred to as batch gas cycling, it is believed that the increased pressure allows the gas to flow into the less permeable zones of the reservoir as well as the more permeable zones where it partially dissolves in the oil. During periods of production, the reservoir pressure is reduced, the reservoir fluids expand, some gas comes out of solution and reservoir fluids tend to flow from all portions of the reservoir toward the producing wells. This results in a more efficient sweep of the total reservoir.

However, pressure pulsing processes as previously carried out have not been entirely successful. It has generally been the experience that even though a substantial volume of oil is recovered by one cycle of repressuring and producing, oil recovery drops off sharply during the second and subsequent cycles.

It is an object of this invention to provide an improved pressure pulsing oil recovery process. It is a further object to provide such a process which is effective for a plurality of cycles. It is another object to provide such a process which is operable, utilizing the same well for both fluid injection and fluid production. It is still another object to provide a cyclic secondary recovery process wherein all wells penetrating a reservoir are employed as production wells during the production part of the cycle.

Summary of the invention

The above and related objects, advantages and features of this invention may be achieved by a process wherein oil is recovered from a nonhomogeous subterranean formation or reservoir which may be partially depleted, said formation being penetrated by one or more wells. First, the reservoir hydrocarbons are examined to determine the amount of gas present and the amount of gas dissolved in the oil under reservoir conditions. Next, the reservoir pressure in the drainage area of a well is raised to force a substantial amount of the gas in the formation into a highly compressed state or into solution in the well fluids by:

(a) if the reservoir oil contains a substantial amount of dissolved gas which will come out of solution as the oil is produced, injecting into the formation an aqueous flooding medium; or (b) if the reservoir oil does not contain a substantial amount of dissolved gas, injecting into the formation both a gas flooding medium and an aqueous flooding medium.

The pressured reservoir is produced to the economic limit. The cycle is repeated to recover additional oil using gas, together with an aqueous flooding medium in the pressuring step.

Description of the preferred embodiments

Most oil bearing reservoirs or formations contain at least some sections which tend to retain oil more tightly than other sections. For example, the formation may contain many natural or induced fractures, interconnected vugs, solution channels, heterogeneous lenses or networks of large pore size material dissecting smaller pore size, or is otherwise nonhomogeneous. The area in the immediate vicinity of these fractures or other discontinuities will generally drain more easily than areas more remote from the fractures. Also, sections with a higher permeability and/or porosity will drain better than those with a lower permeability and/or porosity. The process of this invention is especially operable with any such formation which contains sections from which oil can be removed to only a negligible extent by either primary or secondary recovery techniques.

Although there is nothing to preclude the use of the process of this invention on newly drilled or previously unproduced reservoirs, it should be most helpful in treating partially depleted reserviors, e.g., those from which some oil has been produced and the reservoir pressure declined or those which are ready for some sort of secondary recovery process.

Most reservoirs are penetrated by a plurality of wells. In carrying out the process of this invention it is contemplated that the entire reservoir can be alternately pressured and depressured by utilizing one or more wells as injection wells during the pressuring steps, and then shutting in these injection wells while using one or more other wells as production wells during the depressuring steps. In a preferred embodiment, one or more wells are utilized first as injection wells to pressure up only that portion of the reservoir that constitutes the drainage area of these wells. Subsequently, these same wells are converted to production wells during the following production step. This is in contrast to previously known secondary recovery procedures wherein one portion of the wells is utilized for injecting a driving fluid and another portion of the wells is utilized for production. Thus, the process of this invention has the advantage of employing all wells as production wells.

In determining the character of the fluid to be used in the initial pressuring step, the nature of the reservoir hydrocarbons at reservoir conditions must be considered. For example, an aqueous fluid alone may be used if the reservoir pressure is still relatively high or if the reservoir hydrocarbons contain a substantial amount of gas or dissolved gas which, upon further lowering of the pressure, will come out of solution and serve as an expulsive force to help move the oil to the production well. However, both gas and an aqueous fluid should be utilized if the reservoir hydrocarbons consist mostly of dead oil, that is contain no substantial amount of dissolved gas, or if the reservoir pressure is low. In any event, for the second and subsequent pressuring step following a production or depressuring step, both gas and an aqueous fluid should be used as the pressuring fluid.

In carrying out the pressuring step using both gas and an aqueous fluid, the order of injection of the two fluids is optional. Gas and aqueous fluid can be added simultaneously in a series of alternate slugs—all the aqueous fluid first followed by all the gas or all the gas first followed by all the aqueous fluid. It is preferred that at least a substantial part of the gas be injected before all the aqueous fluid is injected. In an especially preferred embodiment, the gas is injected first followed by the aqueous fluid.

The volume of gas injection during the pressuring step can be as high as the equivalent of 25 percent of the reservoir free gas volume at the start of the pressuring step or as low as 2.5 percent. Any amount of gas injection preceding the aqueous fluid injection will improve oil recovery from the process, and the actual volume used will depend primarily on the economics.

It is desired to inject enough aqueous fluid during the aqueous fluid injection part of the pressure step to reduce the free gas saturation to zero. It is not always possible to reduce the free gas saturation to zero as in the case where inert or nonsaturable gas is used. In other uses the maximum safe operating pressure may be reached before the gas saturation is reduced to zero. Normally, the volume of aqueous fluid required will be approximately $1.2 \times N_p \times B_{o2}$ where $N_p$ is the cumulative volume of stock tank oil previously produced from the well and $B_{o2}$ is the formation volume factor at the beginning of the pressuring step. Generally, an amount of aqueous fluid of from one-tenth to one-half of the reservoir pore volume is satisfactory to reach the desired pressure.

The total pressure increase due to gas and aqueous fluid injection should be sufficient to cause a substantial portion of the gas present in the formation to go into solution in the oil. A preferred pressure increase is that about equal to the original reservoir pressure before production of any fluids.

Following the pressurizing step, the same wells are depressured, i.e., produced. Depressuring can be started immediately following pressurizing. However, it is preferred that the well be shut in for a few days before starting the pressuring part of the cycle. During this shut-in time it is believed that the aqueous fluid more completely displaces oil from the tighter sections of the formation. Thus the oil migrates to the larger pores from which it can be more easily produced.

During the depressuring or production step following a pressuring step, the formation is produced until the pressure falls to any low pressure desired, consonant with economic operation of the process, considering (1) the amount of fluid needed to bring the reservoir back to high pressure for the subsequent cycle, (2) the rate of production, and (3) the gas-oil ratio. These considerations are all related to the economy of the process and therefore constitute an operating decision. Generally, a pressure of about 100 p.s.i. below the bubble point of the reservoir hydrocarbons is satisfactory. The cycle is then repeated.

The pressuring-depressuring cycle is repeated for as many times as oil can be economically recovered. Generally, from 1 to 10 cycles can be carried out before oil production during the depressuring step falls to such a low level that additional cycles are not profitable.

The gases which may be employed as a pressuring medium include those materials which are gases at the reservoir conditions existing at the close of a depressuring step. The materials may be gases or liquids under the reservoir conditions existing at the close of the pressuring step, but if liquids, they must gasify during the depressuring step. Normally gaseous hydrocarbons such as natural gas, methane, ethane, propane, and liquefied petroleum gas may be used. These gases are soluble in the reservoir oil under some reservoir conditions. Other materials which may be used include gases other than hydrocarbons which may or may not be appreciably soluble in the reservoir oil such as nitrogen, oxygen, carbon dioxide, combustion gases, ammonia, and sulfur dioxide.

The aqueous flooding media which may be employed as a pressuring medium include liquid fresh water, brine, or steam. For formations containing swellable clays which are sensitive to fresh water, brine may be used or any of the well-known additives for controlling clay swelling may be added to the water.

It is preferred to include a surface active agent in the aqueous fluid to aid capillary retention of aqueous fluid and to aid imbibition. Any of the water soluble surface active agents may be used which increase the water-wettability of the formation matrix. Examples are ammonium or sodium salts of alkyl aryl sulfonates, salts of ether sulfates, quaternary ammonium salts, and ethylene oxide derivatives.

Examples

Oil recovery tests were made using rectangular slab A of Berea sandstone having a permeability of approximately 200 md. Each of the four lateral surfaces of the slab was scribed with five equally spaced longitudinal grooves $\frac{1}{16}$ inch deep and four equally spaced transverse grooves $\frac{1}{16}$ inch deep. The lateral surfaces were then covered with a thin walled steel plate having a height approximately $\frac{1}{2}$ inch less than the height of the lateral surface. The steel plate abutted the entire scribed lateral surface of the slab except at one corner thereof where an extension of the steel plate provided a space between the lateral surface and the steel plate sufficiently large to accommodate a $\frac{1}{4}$ inch diameter tubing fitting. The edges of the steel plate were then bonded to the slab with epoxy resin. In the center of the top face of the slab was drilled a $\frac{1}{4}$ inch diameter vertical hole to within $\frac{1}{4}$ inch of the bottom face. A $\frac{1}{4}$ inch diameter tubing fitting was positioned in this hole and sealed into position with epoxy resin. All exposed surfaces of both the slab and steel plates were then covered with a layer of epoxy resin about $\frac{1}{4}$ inch thick. This left the tubing fitting in the center of the top of the slab and the tubing fitting in the steel plate at one corner of the slab as the only points of contact with the slab. The resulting assembly was placed in a high pressure bomb with tubing attached to each of the two tubing fittings extending outside the bomb. The bomb was filled with oil and pressured up to 500 p.s.i. The slab was saturated with an aqueous brine containing 50,000 p.p.m. sodium chloride by attaching a vacuum pump to the tubing in communication with the lateral surfaces of the slab and pumping the brine into the slab by way of the tubing in communication with the center of the slab. The path of fluid flow was through the tubing into the center of the slab, out to each of the four lateral surfaces, through the grooves between the lateral surfaces and the steel plate to the tubing attached to the corner of the slab and out of the assembly. Flow of brine was continued until the flow of fluid out of the slab was the same as that into the slab, indicating the slab was saturated with brine. The pressure on the brine was gradually raised to 300 p.s.i. during this step. The amount of brine in the slab was then reduced to the irreducible level by pumping through the slab over a 24-hour period about six pore volumes of 80° pale oil at a pressure of 300 p.s.i. A synthetic reservoir oil having a bubbling point pressure of 300 p.s.i. was prepared by contacting petroleum naphtha having a boiling point of 150° C. with ethane gas for 24 hours in a separate bomb at 300 p.s.i. The bomb was continually rocked to improve the naphtha-ethane contact. The slab was saturated with the synthetic reservoir oil by injecting the same into the slab, as described above, over a 24-hour period of 300 p.s.i. During this phase most of the pale oil was replaced by the synthetic reservoir oil. The amount of synthetic oil initially in place was determined by subtracting the amount of oil produced during this phase from that injected. The slab was slowly depressured from 300 p.s.i. to 100 p.s.i. over a 24-hour period by allowing the fluids to flow from the tubing in communication with the corner of slab. The amount of oil and gas produced was measured and reported as primary production and percent of the oil initially in place. The process of the instant invention was then carried out. Brine was injected into the slab via the tubing in communication with the corner of the slab over a 24-hour period to raise the pressure from 100 p.s.i. to 400 p.s.i. Over the next 24-hour period the slab was slowly depressured from 400 p.s.i. to 100 p.s.i. as described above. The amount of oil produced during this step was measured and calculated as percent of the oil initially in place. Next, ethane gas was injected into the slab as described above over a 16-hour period during which time the pressure increased to 300 p.s.i. Over the next 8-hour period, brine was injected into the slab to raise the pressure to 400 p.s.i. The slab was again slowly depressured to 100 p.s.i. over a 24-hour period and the oil produced measured and calculated as percent of the oil initially in place. The percent change in oil production, or percent of oil initially in place, produced following pressuring with both ethane and water, i.e., the second pressure pulse, divided that produced following pressuring with water, i.e., the first pressure pulse, was calculated as 66 percent.

The same test procedure was then repeated using Berea sandstone slab B having one-fourth the top and bottom surface area of slab A and substituting nitrogen for ethane as the gas injected during the second pressure pulsing step. The percent change in oil production between the first and second pressure pulse was calculated as 86 percent.

The same test procedure was again repeated using Berea sandstone slab C of approximately the same dimensions as slab B and with no gas injection during the second pressure pulsing step, i.e., only water was injected to raise the pressure from 100 p.s.i. to 400 p.s.i. The percent change in oil production was calculated as −13. This particular test was not according to the procedures of this invention in that no gas was used in the second pressure pulsing step. The test is presented for comparative purposes to show the effect of the omission of the gas pressurizing fluid.

The same test procedure was again repeated using Indiana limestone slab D having a permeability of 10 md. and having approximately the same dimensions as Berea sandstone slab B. Ethane was the gas injected during the second pressure pulsing steps. The percent change in oil production between the first and second pressure pulse was calculated as 39 percent.

The data pertinent to the four tests described above is presented in the following table. The results show that where a gas was employed with the water during the second pressure pulsing step, a surprisingly larger amount of oil was produced in the subsequent depressuring or production step than was produced when brine alone was used as the pressurizing fluid.

TABLE

| Test variable | Slab | | | |
|---|---|---|---|---|
| | A | B | C | D |
| Lateral surface area of slab, in | 24 x 24 | 11 x 11 | 12 x 12 | 11 x 11 |
| Thickness of slab, in | 2 | 15/16 | 2 | 2 |
| Slab pore volume, cc | 3,958 | 754 | 1,034 | 848 |
| Oil initially in place at 300 p.s.i.g., cc | 2,838 | 539 | 735 | 525 |
| Stock tank oil initially in place (STOIIP), cc | 1,980 | 369 | 514 | 367 |
| Primary production, cc | 247 | 57 | 76 | 83 |
| Percent STOIIP | 12.4 | 15.4 | 14.8 | 22.6 |
| First pressure pulse oil production, cc | 100 | 35 | 33 | 41 |
| Percent STOIIP | 5.0 | 9.5 | 6.4 | 11.2 |
| Gas injected in second pressure pulse | Ethane | Nitrogen | None | Ethane |
| Second pressure pulse oil production, cc | 186 | 58 | 20 | 57 |
| Percent STOIIP | 9.4 | 15.7 | 3.9 | 15.5 |
| Percent change in oil production between 1st and 2nd pressure pulse | +86 | +66 | −13 | +39 |

In the above tests a fracture network was simulated by scribing grooves along the lateral surfaces of the slab. Additional tests were carried out using ungrooved Berea standstone slabs E and F of approximately the same size as slab C above, wherein the effect of addition of a surface active to the aqueous pressuring medium was determined. Using brine as the aqueous pressurizing medium, there was produced during the first depressuring cycle: (a) from slab E, 74 cc. brine and 34 cc. oil for a water-oil ration of 2.17, and (b) from slab F, 86 cc. brine and 51 cc. oil for a water-oil ratio of 1.69. Using brine containing 10 percent by volume of a surface active agent, an alkyl benzene sulfonate wherein the alkyl group contains from 3 to 10 carbon atoms, there was produced during the first depressuring cycle: (a) from slab E, 74 cc. brine and 49 cc. oil for a water-oil ratio of 1.51, and (b) from slab F, 42 cc. brine and 36 cc. for a water-oil ratio of 1.17. Thus, these tests show that the addition of a surface active agent to the aqueous pressurizing medium results in a higher percentage of oil in the fluids produced during the depressuring cycle.

Well example

An Oklahoma subterranean reservoir originally produces oil at the rate of about 150 barrels per day per well and has a formation pressure of 2700 p.s.i. After 6 years, production has fallen to about 10 barrels per day per well oil and formation pressure has declined to 700 p.s.i. It is desired to treat a five-spot pattern of wells penetrating this reservoir according to the secondary recovery process of this invention. In the first step, the drainage area of these wells is to be pressured up to 3000 p.s.i. by injecting 100,000 barrels water simultaneously into each of the five wells over a 60-day period of time. In the second step, the wells are to be returned to production. For the first five months of production, the wells are expected to produce only water at the rate of about 150 barrels per day per well. After this time, the wells are expected to begin producing oil along with the water. The ratio of oil to water produced will gradually increase. Production is to be continued for 1.5 years from the time the aforementioned water injection ceases. At the end of this time the wells should be averaging about 15 barrels per day oil and 0 barrel per day water. The formation pressure is expected to have fallen to about 1500 p.s.i. The wells are then to be repressured up a second time by injecting both gas and water. In the third step, 8 million cubic feet ethane are to be simultaneously injected into each of the five wells over a period of 10 days to raise the formation pressure surrounding the wells to about 1700 p.s.i. In the fourth step, 66,000 gallons water are to be injected into each well over a period of 45 days to increase the pressure to 3,000 p.s.i. In the fifth step, the five wells are to be returned to production and produced, as in the second step, until the formation pressure surrounding the wells has declined to about 1500 p.s.i. The pressuring-depressuring cycle is repeated as many times as is economically feasible.

Although various embodiments of the invention have been described, it will be understood, of course, that the invention is not limited thereto, but many modifications may be made in process conditions without departing from the spirit and scope of the invention. The examples are given by way of illustration only, and the invention is limited only by the terms of the appended claims.

What is claimed is:

1. Method of recovering oil from a nonhomogeneous partially depleted subterranean formation containing free gas and penetrated by one or more wells comprising:
    (a) injecting into said formation via an injection well both a gas flooding medium and a liquid aqueous flooding medium to increase the formation pressure within the drainage area of the injection well to force into solution in said oil a substantial part of free gas present in the formation; and
    (b) producing the formation via a production well to decrease the formation pressure thus causing a substantial part of the said gas to come out of solution in said oil.

2. The method of claim 1 wherein the injection well and the production well are the same.

3. The method of claim 1 wherein at least a substantial part of the gas injected is injected before injecting the liquid aqueous flooding medium.

4. The method of claim 1 wherein the gas is a normally gaseous hydrocarbon.

5. The method of claim 1 wherein the gas is not appreciably soluble in the reservoir oil.

6. The method of claim 1 wherein the liquid aqueous flooding medium is water or steam.

7. The method of claim 1 wherein the liquid aqueous flooding medium contains a surface active agent.

8. The method of claim 1 wherein the formation oil is dead oil.

9. Method of secondary recovery of oil from a partially depleted nonhomogeneous subterranean formation containing free gas and utilizing a single well comprising:
    (a) injecting a slug of gas through said well into the formation comprising from 2.5 to 25 percent of the reservoir free gas volume;
    (b) injecting a slug of water through said well into the formation comprising from one-tenth to one-half reservoir pore volumes; and
    (c) producing the well to decrease the pressure thereof to about 100 p.s.i. below the bubble point of the reservoir hydrocarbons.

10. Method of secondary recovery of oil from a partially depleted nonhomogeneous solution drive reservoir penetrated by at least one well said reservoir containing free gas and a substantial amount of gas dissolved in said oil comprising:
    (a) injecting into the reservoir via a well a slug of a liquid aqueous flooding medium to raise the reservoir pressure in the drainage area of said well to a value at which a substantial part of the free gas present in the drainage area has gone into solution in the oil;
    (b) producing this same well to the economic limit;
    (c) injecting into the reservoir via the same well both a gas flooding medium and a liquid aqueous flooding medium to raise the reservoir pressure in the drainage area of said well to a value at which a substantial part of the free gas has gone into solution; and
    (d) producing this same well to the economical limit

References Cited
UNITED STATES PATENTS

| | | | |
|---|---|---|---|
| 1,067,868 | 7/1913 | Dunn | 166—9 X |
| 1,658,305 | 2/1928 | Russell | 166—9 |
| 1,787,972 | 1/1931 | Doherty | 166—2 |
| 2,609,051 | 9/1952 | Brownscombe | 166—7 |
| 2,669,306 | 2/1954 | Teter et al. | 166—9 |
| 2,724,437 | 11/1955 | Whorton et al. | 166—42 X |
| 3,101,782 | 8/1963 | Holm | 166—9 |
| 3,065,590 | 11/1962 | Holm | 166—9 |
| 3,123,134 | 3/1964 | Kyte et al. | 166—2 |
| 3,333,637 | 8/1967 | Prats | 166—40 |

CHARLES E. O'CONNELL, Primary Examiner

IAN A. CALVERT, Assistant Examiner

166—272, 274, 303
U.S. Cl. X.R.

PO-1050
(5/69)

UNITED STATES PATENT OFFICE
CERTIFICATE OF CORRECTION

Patent No. 3,480,081           Dated November 25, 1969

Inventor(s) Martin Felsenthal, Howard H. Ferrell and Robert R. Matthews

It is certified that error appears in the above-identified patent and that said Letters Patent are hereby corrected as shown below:

Column 6, in the Table, 2nd line under Slab B, "15/16" should be -- 1 15/16 -- .

Column 6, in the Table, 4th line under Slab B, "539" should be -- 528 -- .

Column 6, line 45, "ration" should be -- ratio -- .
line 52, after "36 cc." should be inserted -- oil -- .

SIGNED AND
SEALED
JUL 21 1970

(SEAL)
Attest:

Edward M. Fletcher, Jr.
Attesting Officer

WILLIAM E. SCHUYLER, JR.
Commissioner of Patents